United States Patent Office

Re. 25,866

Reissued Sept. 21, 1965

25,866

WARFARIN SODIUM

Collin H. Schroeder and Karl Paul Link, Madison, Wis., assignors to Wisconsin Alumni Research Foundation, Madison, Wis., a corporation of Wisconsin No Drawing. Original No. 3,077,481, dated Feb. 12, 1963, Ser. No. 90,645, Feb. 21, 1961. Application for reissue Jan. 21, 1965, Ser. No. 441,943

6 Claims. (Cl. 260—343.2)

Matter enclosed in heavy brackets [ ] appears in the original patent but forms no part of this reissue specification; matter printed in italics indicates the additions made by reissue.

The present invention relates to warfarin known chemically as 3 - (α-acetonylbenzyl)-4 - hydroxycoumarin and more specifically to improvements in the art and science of purifying the sodium derivative of warfarin, i.e. warfarin sodium.

The alkali metal derivatives of warfarin (sometimes referred to as salts of warfarin) can be prepared by reacting an aqueous slurry of warfarin containing excess warfarin with an aqueous solution of alkali metal hydroxide and then removing the excess warfarin as described in Link Patent 2,777,859. The alkali metal derivatives of warfarin can also be prepared by a modification of the patented Link process, supra, noted below in Example III.

The use of the sodium derivative of the widely used rodenticide warfarin (see Link, K. P., and Ross, Ward, Pest Control, August 1956) as an anticoagulant in the clinical field is now well known. See the New York Heart Association (New York Academy of Medicine) lecture entitled "The Discovery of Dicumarol and Its Sequels," of February 25, 1958, by Karl Paul Link. Circulation, 19, No. 1, pages 97–107 (1959). See also Pollock B. E., J.A.M.A. 161, 404 (1956) and Shapiro et al., J.A.M.A. 165, 1377 (1957) and the other 16 citations in "Warfarin Sodium in Human Medicine," prepared for Poison Control Centers, by Wisconsin Alumni Research Foundation (1958). Indeed, warfarin sodium has been called the "more nearly ideal anticoagulant drug now available." Nicholson, J. H., New England Jl. of Medicine, 255, 491 (1956). See also Baer, S., J.A.M.A. 167, 704, June 1958; editorial, "Anticoagulants—A Cooperative Effort," J.A.M.A. 169, 172/1484 (March 28, 1959); Mouquin, M., et al., "Le Traitement Anticoagullant par la Warfarin Sodique en Cardiologie," La Presse Médicale, 68 1079–1087 (1960).

In early research investigations in this field it was noted that warfarin sodium when in aqueous solution had a slight yellow color or took on a yellow color on standing which was followed by the formation of precipitates. Aside from the fact that ampules containing off color solutions with precipitates were unacceptable for use intravenously in the clinical field, attempts were made to solve this problem as warfarin medicaments used in this field should be free or substantially free from non-warfarin products and this is particularly true where, as here, the products were not completely determined. The desirability of eliminating so far as possible all known and unknown impurities in warfarin sodium for medicinal use with human beings is enhanced by the rapidly increasing prophylactic use of this drug on a long term basis. See Hiram H. Belding, M.D. "Prophylactic Use of Anticoagulants in Postoperative Patients," Western Journal of Surgery, Obstetrics and Gynecology 68:84–89, March-April 1960. During this investigation it was found that aqueous solutions of warfarin sodium containing free alkali were yellow in color and formed precipitates relatively rapidly and that warfarin sodium (or solutions of warfarin sodium) should therefore be free from free alkali. This problem was solved by the use of excess warfarin resulting in the preparation of a substantially alkali-free warfarin sodium in accordance with the process of Link Patent 2,777,859. It was also found that the color developed in the presence of free alkali (see alkaline color value referred to below) is due in a small measure to warfarin sodium but in a large measure to byproducts including phenolic products, one of which has been isolated and identified as 3-(o-hydroxyphenyl)-5-phenyl-2-cyclohexene-1-one from warfarin sodium preparations. These undesirable color producing compounds can be materially reduced by treating an aqueous solution of warfarin sodium prepared with excess warfarin with activated charcoal as described in Link Patent 2,777,859.

The products prepared as describe above have been used successfully in the clinic but the search has continued for means of preparing improved products, i.e. products with still lower alkaline color values. This value can be obtained by dissolving 1.25 g. of warfarin sodium in 10 ml. of 5% aqueous NaOH and within 15 minutes determining the optical density in the one cm. cuvette at 385 mμ using 5% aqueous NaOH as the blank. A product with the lowest possible alkaline color value is desired, as the amountof non-warfarin material responsible for color change and the formation of precipitates, decreases as the color value decreases.

Continued efforts to realize a more practical procedure for the production of high purity warfarin sodium involving various solvents and combinations of solvents led to an unexpected and unique property of warfarin sodium. Solvents in which warfarin sodium is soluble, including methanol, ethanol, n-propyl alcohol, n-butyl alcohol, t-butyl alcohol, ethyl acetate, acetone and N,N-dimethyl-formamide, would not yield a crystalline product. The products in all cases, after removal of the solvent, were obtained in amorphous form with the original impurities. However, it was discovered that when warfarin sodium is in solution in A.R. isopropyl alcohol ($C_3H_7OH$, B.P. 82.4° C.), the warfarin sodium reacts with the isopropyl alcohol to form a warfarin sodium·isopropyl alcohol complex which crystallizes and is readily separated from the no-warfarin impurities.

The solubility of the crystalline warfarin sodium·isopropyl alcohol complex in refluxing isopropyl alcohol (A.R.) is about 1 gm./100 ml. In sharp contrast, the solubility of amorphous warfarin sodium in isopropyl alcohol at room temperature, e.g. about 20–25° C., is at least 30 gm./100 ml.

The unique solubility property of the warfarin sodium·isopropyl alcohol complex in isopropyl alcohol is apparent from the fact that the complex and amorphous warfarin sodium have essentially similar high solubilities in water, ethanol and acetone, and similar low solubilities in ethyl ether and methylene dichloride.

An additional indication of the uniqueness of the warfarin sodium·isopropyl alcohol complex is the surprising and unexpected fact that attempts to form a corresponding warfarin potassium·isopropyl alcohol complex have been unsuccessful.

The crystalline warfarin sodium isopropyl alcohol complex contains about 5.7 percent by weight of isopropyl alcohol. [This corresponds to ⅓ mol. of isopropyl alcohol per mol. of warfarin sodium.]

$$[C_{19}H_{15}O_4Na \cdot \tfrac{1}{3}C_3H_7OH]$$

Analysis.—[Calcd.: C, 68.57%; H, 5.28.] Found: C, 68.23; H, 523.

The composition of the crystalline warfarin sodium·isopropyl alcohol complex is not changed by repeated washing with ethyl ether or methylene dichloride—solvents in which free isopropyl alcohol is readily soluble.

Though isopropyl alcohol boils at 82.4° C. at 760 mm. pressure, heating the complex of the present invention [, $C_{19}H_{15}O_4Na \cdot \frac{1}{3}C_3H_7OH$,] at 100° C. for 3–5 hours over $P_2O_5$ at 0.5 mm. pressure does not remove the isopropyl alcohol. To remove the isopropyl alcohol from the complex, it is necessary to heat at 145° C. under 1.0 mm. pressure for 24 hours. Under these conditions, release of the isopropyl alcohol occurs with some decomposition of the warfarin sodium (that is, the alkaline color value is increased).

To release the isopropyl alcohol from the warfarin sodium·isopropyl alcohol complex quickly, temperatures of about 230° C. or higher (760 mm. pressure) are necessary. At these high temperatures the complex melts and decomposes rapidly, with a quantitative release of the isopropyl alcohol.

According to Mellor, J. W., "Modern Inorganic Chemistry," 8th ed., Longmans Green & Company, London, 1935, p. 284, the mode of combination of the water molecules, generally called "water of crystallization," is not clear. Likewise, the mode of combination of the isopropyl alcohol molecules in the crystalline warfarin sodium·isopropyl alcohol complex is not known. The "isopropyl alcohol of crystallization" is part of the crystal structure or lattice. The crystallinity of the complex has been demonstrated by X-ray diffraction studies.

The infra-red spectrum of the warfarin sodium·isopropyl alcohol complex shows $\lambda_{KBr}^{max.}$ at 2.83, 3.40, 8.83, 10.50, and 14.46$\mu$—

These peaks are not shown by amorphous warfarin sodium and are attributed to the isopropyl alcohol in the crystal lattice of the warfarin sodium·isopropyl alcohol complex.

The following examples will serve to illustrate the invention.

EXAMPLE I

Preparation of warfarin sodium·isopropyl alcohol complex from warfarin

The warfarin sodium solution obtained from warfarin by the process of Example I, U.S. Patent No. 2,777,859 (containing about 21.4% of the warfarin sodium derivative by weight), is first concentrated under reduced pressure of about 12–20 mm. with a bath temperature of about 80° C. until the solution is in a light to medium syrup stage. At this stage about ¾ of the water has been removed. The removal of the water is then facilitated by adding 100 ml. of A.R. isopropyl alcohol which with the water forms a constant boiling mixture. The removal of the water and the isopropyl alcohol is then continued under vacuum with a bath temperature of about 50° C. until the heavy syrup stage is reached. At this point a second portion of about 100 ml. of A.R. isopropyl alcohol is added (drying under vacuum as above) to promote and hasten the water removal with the concomitant formation of the warfarin sodium·isopropyl alcohol complex. A third 100 ml. portion of isopropyl alcohol is then added and the water removal continued. After the third portion of isopropyl alcohol has been added the warfarin sodium·isopropyl alcohol complex begins to form rapidly and then separates in the crystalline form. The drying of the complex in the flask is continued under reduced pressure (10 mm. or less at 30–40 C.).

Finally the crystalline product is removed from the flask and washed with 200 ml. of A.R. isopropyl alcohol. The free isopropyl alcohol is removed by washing with methylene dichloride or ethyl ether. The isopropyl alcohol wash removes the majority of the non-warfarin sodium impurities without dissolving the crystalline warfarin sodium·isopropyl alcohol complex. The product can be dried as described below in Example II.

The alkaline color value of the complex prepared as described above, before washing with isopropyl alcohol, is about 0.2 (ca. 70 p.p.m. non-warfarin material). The alkaline color value is reduced to 0.1 (ca. 35 p.p.m. of non-warfarin material) after the isopropyl alcohol wash. The resulting product, warfarin sodium·isopropyl alcohol complex, contains about 94.3% warfarin sodium and about 5.7% isopropyl alcohol by weight. It is free from unbound isopropyl alcohol and is stable at room temperature.

EXAMPLE II

Preparation of warfarin sodium·isopropyl alcohol complex from amorphous warfarin sodium About 100 g. of amorphous warfarin sodium (with an alkaline color value of 1.82, 640 p.p.m. non-warfarin materials) is added to 500 ml. of isopropyl alcohol (A.R., containing 0.5 percent water or less) at room temperature. After solution is effected it is filtered if any insoluble non-warfarin materials are present. The isopropyl alcohol solution is then heated to 50–70° C. at which point crystallization of the warfarin sodium·isopropyl alcohol complex occurs. The solution is then allowed to cool slowly to room temperature. During the cooling process crystallization of the warfarin sodium·isopropyl alcohol complex takes place and a thin slurry is formed. The resulting slurry is stirred for about 4 hours and finally filtered to remove the excess isopropyl alcohol containing the non-warfarin impurities in solution.

The crystalline warfarin sodium·isopropyl alcohol complex filter cake is first air dried and then washed with about 300 ml. of methylene dichloride to remove free isopropyl alcohol. The crystalline product is finally air dried or dried to constant weight at room temperature under 15 mm. pressure.

The dry crystalline warfarin sodium·isopropyl alcohol complex contains about 5.7 percent (by weight) of isopropyl alcohol [, which is equivalent to $$C_{19}H_{15}O_4Na \cdot \frac{1}{3}C_3H_7OH]$$

and shows an alkaline color value, expressed in optical density, of 0.095. It contains about 33 p.p.m. of non-warfarin material.

EXAMPLE III

Preparation of warfarin sodium·isopropyl alcohol complex from amorphous warfarin sodium This example follows the procedure of Example II, except that the amorphous warfarin sodium (starting material) has an alkaline color value of 0.276 (or 96.5 p.p.m. non-warfarin materials) and is obtained by adding aqueous sodium hydroxide to an aqueous acetone slurry containing excess warfarin as described in our copending application Serial No. 90,613, filed February 21, 1961. The crystalline warfarin sodium·isopropyl alcohol complex prepared in this example has an alkaline color value of 0.055 (or 19.3 p.p.m. non-warfarin materials).

If desired the isopropyl alcohol can be removed from the crystalline warfarin sodium·isopropyl alcohol complex by the following procedure. The complex is first dissolved in absolute ethanol in a ratio of about 1 to 4 (w./v.). The resulting ethanol solution is then concentrated and dried under reduced pressure (e.g. 12–20 mm.) at a temperature up to about 50° C. Both the isopropyl alcohol and ethanol are removed during the drying step which follows the latter stages of the drying procedure described in Link Patent 2,777,859.

This application is a continuation-in-part of our application Serial No. 795,356, filed February 25, 1959, now abandoned.

It is claimed:

1. The process of purifying warfarin sodium which comprises dissolving amorphous warfarin sodium in warm isopropyl alcohol, stirring the resulting solution while it is cooling to room temperature, and recovering the resulting crystalline warfarin sodium·isopropyl alcohol complex precipitate.

2. The process of claim 1 where the crystalline warfarin sodium·isopropyl alcohol complex is dissolved in absolute ethanol and the resulting solution is concentrated and dried under reduced pressure at a temperature of about 50° C. to remove the ethanol along with the isopropyl alcohol from the crystalline complex.

3. The process of preparing the crystalline warfarin sodium·isopropyl alcohol complex of claim 6, which comprises reacting warfarin sodium with excess isopropyl alcohol at a temperature of about 50 to 70° C.

4. The process which comprises concentrating an aqueous warfarin sodium solution under reduced pressure to a light medium syrup stage, adding isopropyl alcohol and concentrating the resulting mixture under vacuum to a heavy syrup stage, adding additional isopropyl alcohol and continuing concentrating under vacuum as the warfarin·sodium separates in crystalline form as a warfarin sodium isopropyl alcohol complex.

5. In the process of decreasing the alkaline color value of warfarin sodium, the steps which consist in crystallizing warfarin sodium in isopropyl alcohol as a crystalline warfarin sodium·isopropyl alcohol complex and washing the crystalline complex with methylene dichloride to remove free isopropyl alcohol.

[6. A crystalline warfarin sodium·isopropyl alcohol complex of the formula $C_{19}H_{15}O_4Na \cdot \frac{1}{3}C_3H_7OH$ and consisting of ⅓ mole of isopropyl alcohol per mole of warfarin sodium, said complex being stable at room temperature and when washed with solvents, selected from the group consisting of ethyl ether and methylene dichloride in which free isopropyl alcohol is readily soluble.]

*7. A crystalline warfarin sodium·isopropyl alcohol complex predominating in warfarin sodium and containing isopropyl alcohol, said complex being stable at room temperature and when washed with solvents, selected from the group consisting of ethyl ether and methylene dichloride, in which free isopropyl alcohol is readily soluble.*

No references cited.

WALTER A. MODANCE, *Primary Examiner.*